United States Patent
Gjedebo

(12) 
(10) Patent No.: US 6,195,960 B1
(45) Date of Patent: Mar. 6, 2001

(54) DEVICE FOR PACKAGING PIPES INTO A CASE AND TAKING THEM OUT THEREFROM

(75) Inventor: Jon Gjedebo, Stavanger (NO)

(73) Assignee: Hitec ASA, Forus (NO)

( * ) Notice: Subject to any disclaimer, the term of this patent is extended or adjusted under 35 U.S.C. 154(b) by 0 days.

(21) Appl. No.: 09/254,378

(22) PCT Filed: Sep. 10, 1997

(86) PCT No.: PCT/NO97/00243

§ 371 Date: Mar. 5, 1999

§ 102(e) Date: Mar. 5, 1999

(87) PCT Pub. No.: WO98/10986

PCT Pub. Date: Mar. 19, 1998

(30) Foreign Application Priority Data

Sep. 13, 1996 (NO) .................................................... 963822

(51) Int. Cl.[7] .............................. B65G 1/04; B65G 3/12; B65G 5/10
(52) U.S. Cl. .................................. 53/245; 53/148; 53/235; 53/246; 53/537; 414/42; 414/417; 29/255; 29/263; 29/774; 29/793; 29/809; 29/822; 269/55
(58) Field of Search .............................. 53/148, 535, 537, 53/235, 236, 245, 246, 243, 242; 414/417, 42; 29/774, 781, 793, 809, 822, 255, 263; 269/58, 55

(56) References Cited

U.S. PATENT DOCUMENTS

| | | | |
|---|---|---|---|
| 3,780,883 | * 12/1973 | Brown | 214/2.5 |
| 3,916,500 | * 11/1975 | Brown | 29/240 |
| 4,344,523 | * 8/1982 | May et al. | 198/424 |

FOREIGN PATENT DOCUMENTS

| | | |
|---|---|---|
| 1207716 | 2/1960 | (FR) . |
| 2387179 | 11/1978 | (FR) . |

* cited by examiner

Primary Examiner—Peter Vo
Assistant Examiner—Hemant M Desai
(74) Attorney, Agent, or Firm—Andrus, Sceales, Starke & Sawall, LLP

(57) ABSTRACT

A device for placing pipes (5') into a case (1) and taking pipes (5) out therefrom, wherein the pipes (5) are placed in stacks (2, 3, 4) each with one pipe across, and wherein the stacks are supported laterally by supports (6, 7, 8, 9) projecting upwardly from the bottom of the case (1). The bottom of the case 91) is provided with apertures (10, 11), and the case (1) is carried by a tilting device (13) capable of raising and lowering the case 91), respectively, and of turning it about an axis (14) parallel to the pipes (5) within the case (1), to take an unloading position and a loading position, respectively, wherein the supports (6, 7, 8, 9) are nearly horizontal, flushing with a substantially horizontal support for pipes (5), and wherein a pushing device (16) is adapted to be guided through the apertures (10, 11) in the nearly vertical bottom of the case (1), in order to push pipes (5) laterally out of the case (1), upon said support, which may be a conveyor belt or another conveyor (12).

3 Claims, 2 Drawing Sheets

DEVICE FOR PACKAGING PIPES INTO A CASE AND TAKING THEM OUT THEREFROM

BACKGROUND OF THE INVENTION

The invention relates to a device for putting pipes into a case and taking them out therefrom.

Pipes guided down into oil wells, such as drill pipes, drill collars and casings of offshore oil installations, can advantageously be transported in protecting cases.

However, the use of such cases involves extra work of putting pipes into cases and of taking them out therefrom.

SUMMARY OF THE INVENTION

The object of the invention is to provide a device adapted to be used for mechanizing and automatizing the work of taking pipes out of cases and putting pipes into cases.

The object is achieved by features as defined in the following description and claims.

The device of the invention comprises a case and an apparatus adapted to raise and lower a case containing pipes, as well as to turn the case around an axis parallel to the longitudinal direction of the case and of the pipes, and also devices for guiding pipes out from a case and into a case.

Pipes having a large diameter may require one case each, while pipes having a smaller diameter are stacked one above the other so that several parallel stacks are formed, each stack comprising at least one pipe in the width direction of the case. This is achieved by placing the pipes between supports projecting upwardly from the bottom of the case as a lateral row of fingers or fork tines, e.g. at the ends of the case.

The bottom of the case is provided with fasteners for supports in such a way that a number of supports and the spacing therebetween may be adjusted to the actual pipe diameter. In order to avoid that the outer pipe stacks overload the side walls of the case, supports may advantageously be disposed between the outer pipe stacks and the side walls of the case, or the side walls of the case may be strengthened.

Fasteners for supports may be disposed on a lateral rail at the bottom of the case. Further, the bottom of the case is provided with apertures in the form of lateral slots, preferably one slot at each end.

When a case is to be emptied and the pipes removed therefrom, it is turned laterally, about 85°, so that the bottom of the case takes an approximately vertical position, but also such that the pipes do not roll out of the case. Thus, the pipes lie in layers in slightly sloping planes, each layer of pipes resting on said supports.

By displacing one layer of pipes upwardly on a slightly inclined substratum, i.e. the supports, the pipes, one and one, being pushable out of the case, a first pushing device may be guided into the case through said apertures in the bottom of the case. For each pipe layer to be pushed out, the case is positioned vertically so that the tops of the supports on which the pipes rest, become aligned with a supporting plane, such as a table or a conveyor belt. For each pipe layer, the vertical position of the case is readjusted.

On the other hand, pipes may be placed in a case by pushing the pipes laterally from a supporting plane and into a previously turned and vertically positioned case by means of a second pushing device. For each layer of pipes filled into the case, the vertical position of the case is readjusted.

BRIEF DESCRIPTION OF THE SEVERAL VIEWS OF THE DRAWING

The invention is further described by means of a non-restricting exemplary embodiment, reference is being made to the attached drawings, wherein.

DETAILED DESCRIPTION OF THE INVENTION

Figure 1:
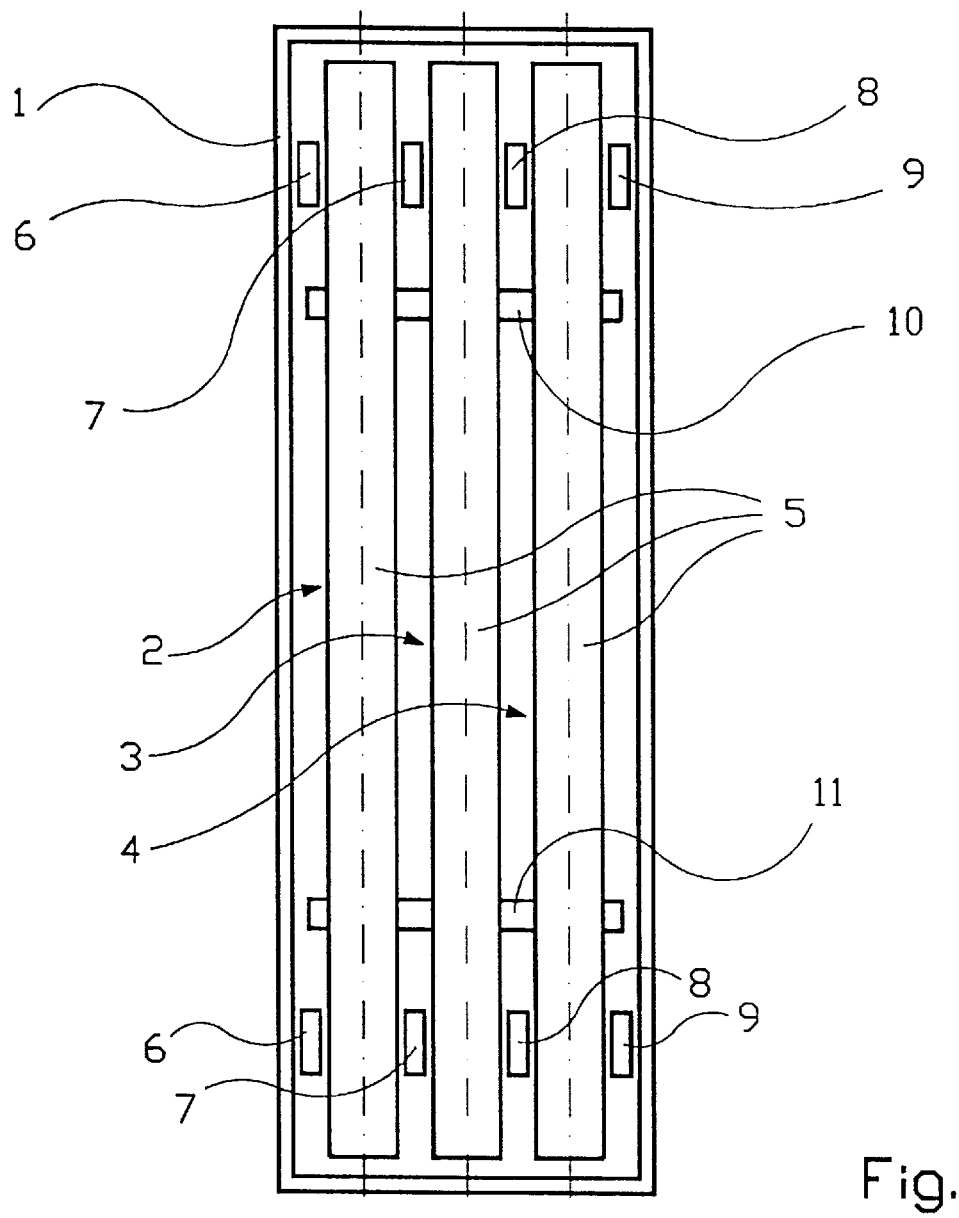
FIG. 1 shows diagrammatically in a top plan view a case containing several stacks of pipes laterally separated by means of supports.
Figure 2:
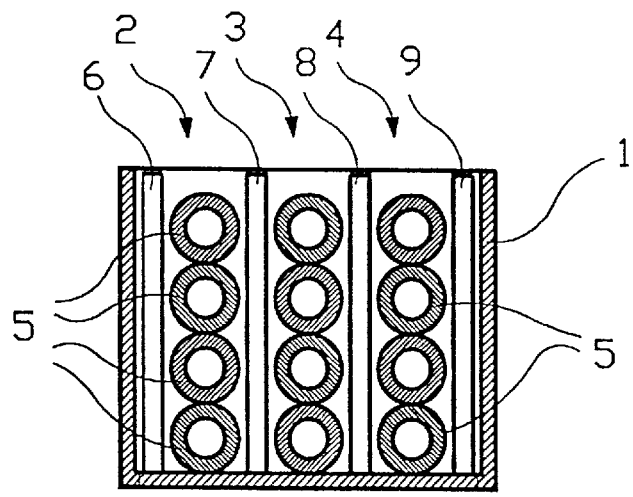
FIG. 2 shows diagrammatically the case as seen in a vertical section of a side elevational view.

In FIG. 1, reference numeral 1 denotes a case having three stacks 2, 3, 4 of pipes 5, see also FIG. 2. Each stack 2, 3, 4 comprises only one pipe 5 across and is supported laterally by one set of supports 6, 7, 8 and 9 disposed at each of the two end portions of the case and attached right-angledly to the bottom of the case 1.

In the bottom of the case 1, apertures 10, 11, here shown as lateral slots, are disposed at the end portions of the case 1.

Figure 3:
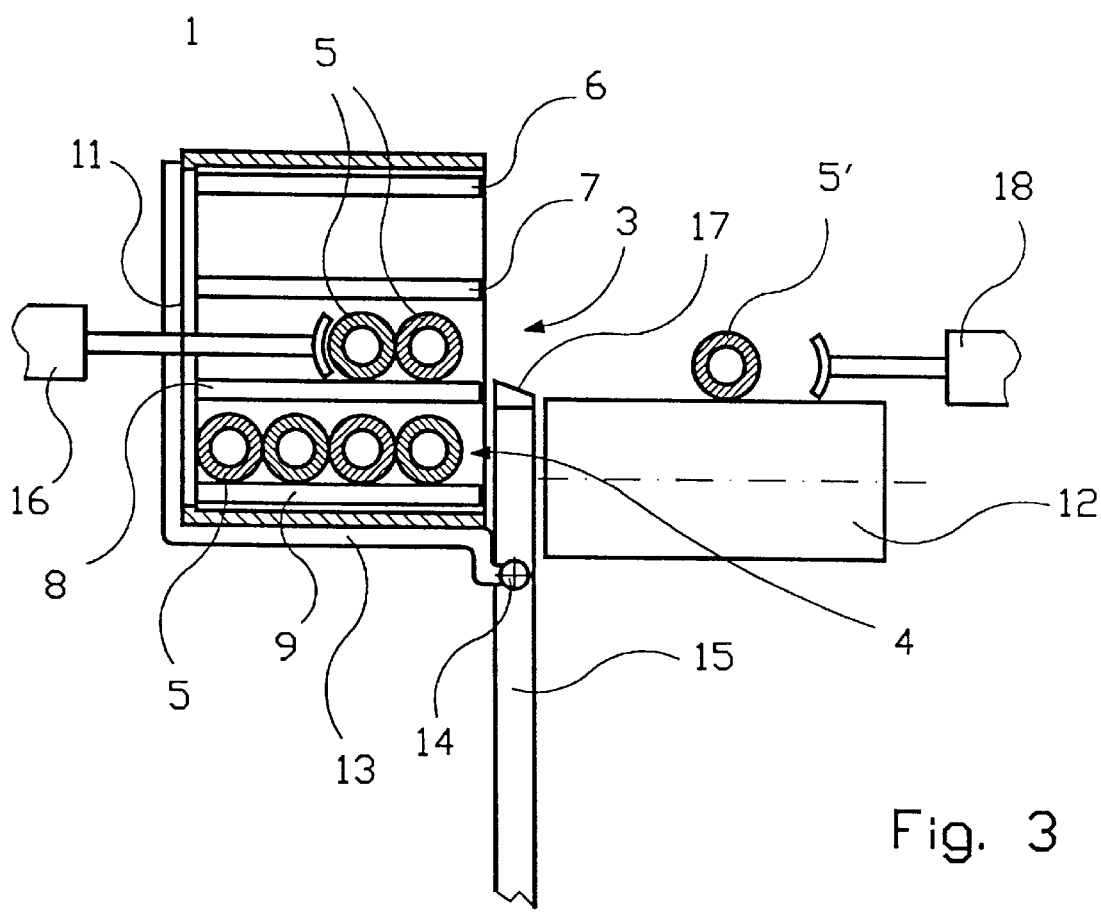
FIG. 3 shows diagrammatically the case on a tilting device in an unloading/loading position.

In FIG. 3, the case 1 is turned approximately 87° to take an unloading position and thusly positioned that the top of the supports 8 becomes approximately aligned with a conveyor 12 in the form of a conveyor belt running along the case. The pipes 5 previously resting on the supports 7, are already out of the case 1 such as shown in FIG. 3.

The case 1 is placed on a tilting device 13 turnable about an axis 14 parallel to the longitudinal direction of the case 1 as well as assigned a shaft which can be guided along a vertical rail 15. The tilting device 13 which can be formed as an angle lever, may be turned about the axis 14 and guided vertically along the rail 15 by means of preferably hydraulic actuators, not shown. A first slider 16 is, as shown, guided through the aperture 11 in the bottom of the case 1, the slider 16 pushing on the pipe 5 closest to the bottom of the pipe stack 3, which now forms a layer of pipes 5 resting on the supports 8. The tilting device 13 is positioned vertically such that the free ends of the supports 8 become flush with the top of an inclined plane 17 leading down to the conveyor 12. A pipe 5' is shown lying on the conveyor 12 after having been pushed out from the case 1 and rolled down the inclined plane 17. By retracting the first slider 16 and activating a second slider 18, the pipe 5' may, if desirable, be pushed laterally back into the case 1 again.

What is claimed is:

1. A device for placing pipes into, and removing pipes from, an elongated parallelepipedal case, the case having a longitudinal axis and an opening through which the placing or removing of pipes can occur, said case having a bottom wall positioned opposite said opening, the pipes being placed into the case in longitudinal stacks each of which is one pipe across, the stacks being supported in the case by intermediate supports projecting from the bottom wall of the case, the bottom wall of the case being further provided with apertures intersecting the longitudinal stacks of pipes, the device comprising:

an external support for the pipes a frame adjacent said external support;

a raisable and lowerable carrier for receiving the case, said carrier being vertically displaceable along said frame to raise and lower the case with respect to said external support, said carrier being pivotally disposed with respect to said frame about a horizontal axis parallel to the longitudinal axis of the case when the case is received in said carrier to turn the carrier and case about an axis parallel to the longitudinal axis of the case, said turning moving the case between a pipe loading and unloading position in which the case is oriented so that the opening is vertical and adjacent said external support and the intermediate supports extend horizontally and a storage position in which the case is oriented so that the opening faces upwardly, the carrier and case being vertically displaceable along said frame to align said intermediate supports with said external support; and an external, horizontally extendible and retractable pushing device placed at the opposite side of the pivotally supported carrier from said external support and further positioned so as to be insertable into the interior of the case through the apertures in the bottom wall of the case when the carrier and case are in the pipe loading and unloading position so that said external pushing device may push pipes within the case horizontally out of the case through said opening and onto said external support.

2. A device as set forth in claim 1, wherein a further external, horizontally extendable and retractable pushing device is disposed immediately above said external support, said further external pushing device being adapted to push pipes from the external support horizontally into the case through the opening of the case when the carrier and case are in said loading and unloading position.

3. A device as set forth in claim 1, wherein said external support comprises a conveyor.

\* \* \* \* \*